United States Patent Office 2,884,581
Patented Apr. 28, 1959

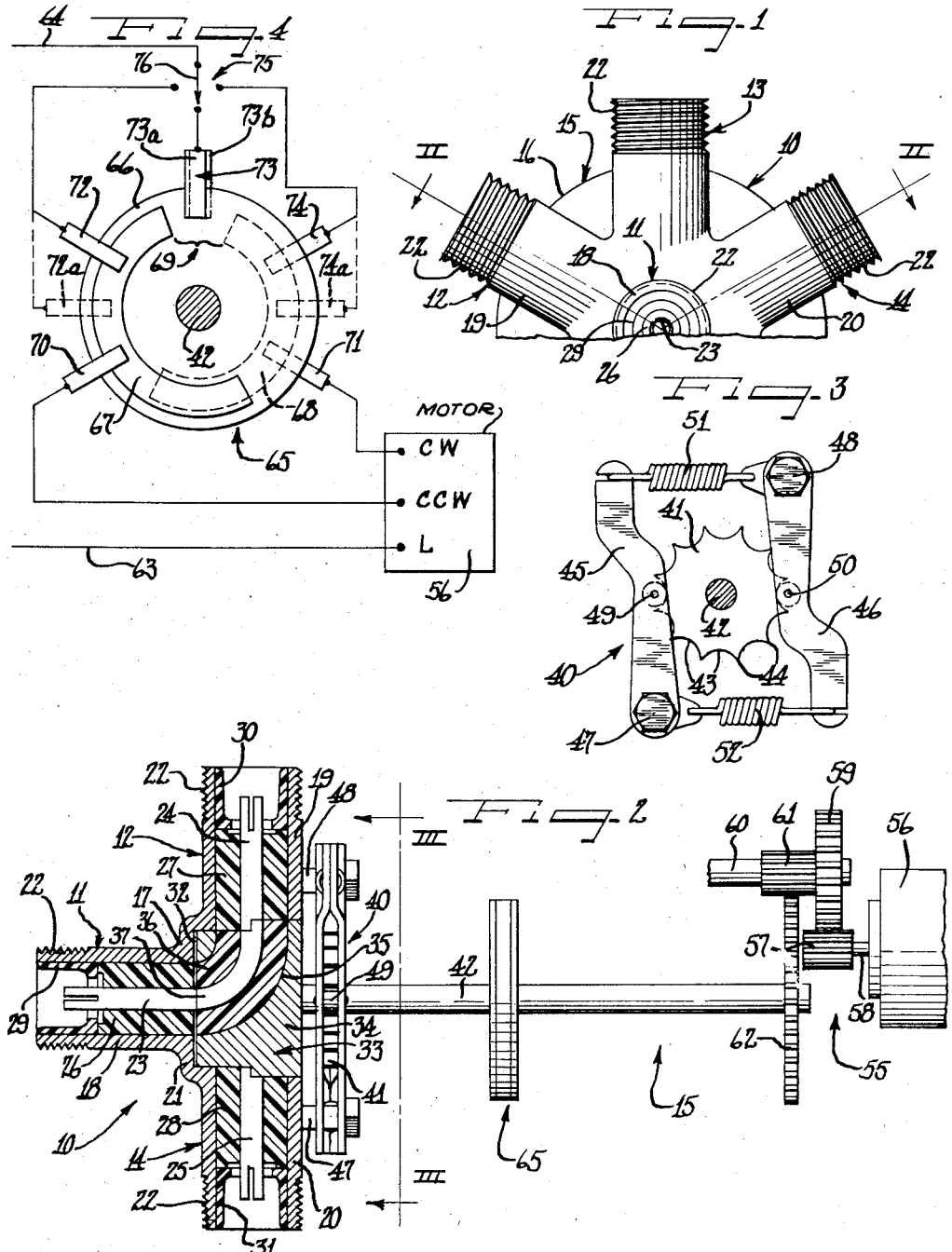

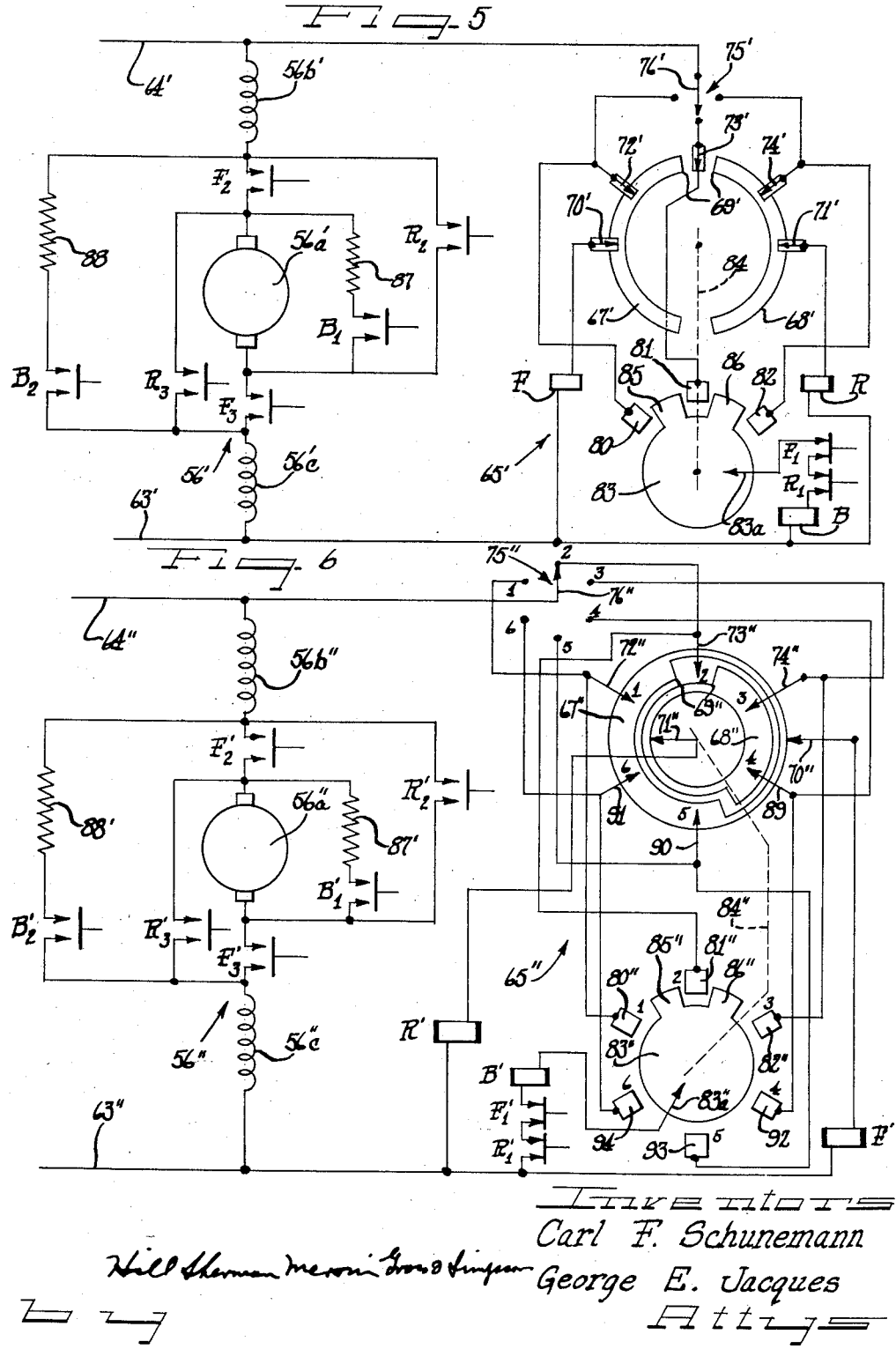

2,884,581

ELECTRIC MOTOR CONTROL SYSTEM

Carl F. Schunemann, East Cleveland, and George E. Jacques, Cleveland, Ohio, assignors to Thompson Products, Inc., Cleveland, Ohio, a corporation of Ohio Application October 15, 1953, Serial No. 386,172

9 Claims. (Cl. 318—467)

The present invention relates to a power drive mechanism and control system and particularly relates to a power drive and control system of controlled directional movement finding most advantageous operation in combination with an electrical system such as a coaxial switch or the like, but also being a system of general utility of controlled bidirectional movement.

By the system of the present invention there is provided a highly efficient smooth-acting power drive mechanism and control system controlled for bidirectional movement in a preselected manner between selected limits whereby the system will be driven to the shortest possible distance between two preselected stations. Systems embodying the principles of the present invention are particularly advantageously employed in conjunction with coaxial switches or the like having a number of stations at preselected positions about the switch assembly.

Coaxial switch systems, as an example of a worthy combination with the present invention, are switch mechanisms preferably having a number of radially extending switch connecter poles positioned about the periphery of a switch rotor and an end conductor connecter axially extending switch pole coupled to the rotor for selected connections with individual one's of the radially extending poles selectively. In modern installations of coaxial switch systems it has been found highly desirable, and even occasionally necessary to be able to switch from one of the radially extending poles to another of the same extremely rapidly and accurately. Therefore, one of the principal objects of coaxial switch operator mechanisms has been to construct the same for rapid and accurate rotation of the coaxial switch rotor.

Most prior art systems, however, of high speed coaxial switch rotational operation, employed an electric motor or like drive power supply of unidirectional angular rotation direction and a selector switch system to energize or deenergize the motor for rotation in that one direction to the proper station therefor. Numerous other systems have also been provided in the art for rotation of the coaxial switch rotor, but these motor driven systems were generally considered as the fastest type of rotor-operated drive systems irrespective of the numerous difficulties often accompanying proper alignment of the switch rotor when employing such motors.

One of the principal difficulties accompanying the use of electrical drives or the like for high speed rotation of coaxial switch rotors was the problem of proper alignment of the center conductor of the coaxial switch rotor with the radial connecter with which it was to be coupled. However, various mechanical systems have been developed which seemingly overcome this difficulty reasonably satisfactorily so long as the motor can be stopped within a reasonable range of proximity to the proper preselected station of angular position therefor. The problem of stopping the electric motor within a reasonably close range of its proper angular position to give the coaxial switch a "sloppy" connection has been a relatively serious one, however, and numerous attempts to obviate the problem have met with only more or less success dependent upon numerous factors of actual operating conditions.

One of the important objects of the present invention, therefore, is to obviate the problem of reasonably accurate stoppage of the drive motor to within a very close range of the preselected angular station therefor. By the system of the present invention power drive and control systems are provided for accurately driving a driven system to a preselected station therefor within a very close range of that station.

Another and very important problem which has faced the prior art systems, particularly with respect to movement of the coaxial switch rotor from one position to another, is the problem of moving the rotor with extremely high speed from one position to another. As stated, the prior art systems have principally been provided with unidirectional rotating motors whereby when two adjacent switch connecter poles are to be successively connected to the switch rotor, drive systems frequently require that the rotor operate through an arc of more than 180° rather than through the shorter arc of less than 180°, depending upon which pole was coupled to the switch rotor and which of the poles was to be connected to the switch rotor.

Therefore, another important object of the present invention is to provide a power drive and control system operable to provide driving power at high speed in a preselected direction, through available bidirectional movement, to reposition the same through movement of the shortest possible distance in the most efficient direction.

Another object of the present invention is to provide a drive power and control system with accurately controlled bidirectional movement.

Another object of the present invention is to provide a drive power and control system with controlled bidirectional movement and accurate braking for accurately angularly positioning the same.

Another object of the present invention is to provide a rotor drive position control system including a controllable bidirectional rotatable power mechanism and a reversible energizing control interconnected with the rotatable power mechanism to control the direction of angular displacement thereof.

Still another object of the present invention is to provide a control and actuator system for rapidly angularly positioning a rotatable mechanism in a preselected angular position selectively, including a rotor drive mechanism and a switch system having a conductive portion thereof rotatable with the drive mechanism and relay elements selectively energizable through said conductive portion to energize said mechanism for rotation in one direction, to energize said mechanism for rotation in opposite direction, and to dynamically brake the mechanism at predetermined angular positions.

Still another object of the present invention is to provide a rotary power drive control system including a switch arrangement having conductive members operatively arranged for controlling the direction of movement of the power drive system and for controllably and selectively energizing the power drive system as described.

Still another object of the present invention is to provide a bidirectional rotary power control system including a switch and rotor drive interconnected arrangement wherein the rotor drive is connected for controlled energization for rotation thereof in one direction or rotation thereof in an opposite direction.

Yet another object of the present invention is to provide a new and improved energization switch control system operable through bidirectional movement to effect conductive connection for energization of the control system for movement thereof in opposite direction selectively.

Still other objects, features and advantages of the present invention will become readily apparent from the following detailed description of the present invention and preferred embodiments thereof, from the appended claims defining the present invention, and from the accompanying sheets of drawings, in which like reference numerals refer to like parts and in which:

Figure 1 is an end elevational view of a portion of a coaxial switch illustrative of the types of the coaxial switches most advantageously employed in combination with the present invention;

Figure 2 is a full sectional view of the coaxial switch and operator system of Figure 1 and taken along the line II—II thereof;

Figure 3 is a backside elevational view of a detent stop and positioning system most advantageously employed in conjunction with the coaxial switch and drive operator and control system embodying the principles of the present invention;

Figure 4 is a schematic illustration of a preferred embodiment of a control and drive system embodying the principles of the present invention;

Figure 5 is another preferred embodiment of the principles of the present invention in schematic illustration; and Figure 6 is still another preferred embodiment of the system of the present invention in schematic illustration.

Attention has already been directed to the fact that systems embodying the principles of the present invention are generally utility systems, but that those systems also find particularly advantageous operation in combination with coaxial switch systems. Therefore, the following detailed description of the systems embodying the principles of the present invention will be made considering preferred embodiments of the present invention in combination with coaxial switch arrangements for controlled operation of the coaxial switches as a preferred example of the operating features of the present invention.

There is illustrated in Figure 1, in broken end elevational view, a coaxial switch system, indicated generally at 10, exemplarly of preferred types of coaxial switch mechanisms. This particular coaxial switch system 10 includes a central axially extending end conductor connecter 11 and a plurality of radially extending connecters 12, 13 and 14. In addition, the coaxial switch mechanism 10 has an operator system 15 connected thereto and generally enclosed in a housing 16. The actual operator mechanism 15 has not been illustrated in Figure 1, but is illustrated substantially in detail in Figure 2 and would be enclosed within the housing 16 therefor.

The coaxial switch system 10 of Figure 1 has been illustrated as having three radially extending conductors 12, 13 and 14 in the half thereof which is illustrated. This particular construction is not critical, however, and although these three radially extending connecters have been shown as having a 60° separation between adjacent connecters, the connecters might have various other arc lengths separations such as 90° or 120° or the like between adjacent connecters. It will be understood, also, of course, that although in Figure 1 is shown a complete coaxial switch having six such connecters, that particular number is not critical and the system may have any desired number; that is, the system may be complete and have three radially extending connecters as shown in Figure 1, or it may have three which are separated by 90° or by 120°, or the system may have two or four or five or six, etc., radially extending connecters regularly disposed thereabout, or irregularly disposed thereabout as desired. The system of Figure 1 has been illustrated as shown merely as an example of one preferred type of coaxial switch system arrangement.

As illustrated in full section, Figure 2, the coaxial switch system 10 is provided with an outer switch housing 17 having an axially extending pipe-like portion 18 and radially extending pipe-like portions 19 and 20 forming the outer conductors of the several connecters 11, 12 and 14, respectively, interconnected through a hub section 21. Each of the pipe-like portions 18, 19 and 20 are threaded at their outer end as at 22 of each, to provide a convenient plug securing means for connection of coaxial conductor lines with the respective poles of the switch system. Inner conductor members 23, 24 and 25 are axially disposed in each of the outer conductor members 18, 19 and 20, respectively, and retained in proper axial position by appropriate dielectric insulator plug members 26, 27 and 28, respectively, and these are retained in proper axial position by plug-type inserts of cup-shape, 29, 30 and 31, respectively. Each of the center conductors 23, 24 and 25 has an outer end slotted in quadrature to provide convenient connection with the center conductor of the coaxial line plug to be connected therewith. These center conductors, as well as the outer conductors, mate with a substantially cylindrical cavity 32 in the hub 21 in which there is rotatably disposed a switch rotor assembly 33. The switch rotor assembly 33 has a conductive rotor block 34 provided with a passage 35 of elbow-like configuration opening at one end to face the axial center conductor connecter 11 and opening at its opposite end through the side of the rotor block 34 to mate with any one of the radially extending connecters such as the connecters 12 and 14. Within the passage 35 an elbow-like dielectric insulator member 36 retains an elbow-like center conductor member 37 in proper position to couple with the center conductor 23 of the connecter 11 and any one of the center conductors such as the center conductors 24 and 25 of the radially extending connecters 12 and 14.

These coaxial switch parts are preferably matched for minimum discontinuity and maximum passage of electromagnetic wave energy and the like and may be varied in numerous ways to accomplish given desired results. For present purposes, however, the coaxial switch may be constructed as described for operation in combination with drive and control systems embodying the principles of the present invention.

Coaxial switch systems such as the system just described, however, are particularly sensitive to accurate alignment between the center conductor of the rotor 33 and the center conductor of the radially extending connecter to which it is to be coupled; in the illustration of Figure 2 the center conductor 37 of the rotor assembly 33 is coupled to the center conductor 24 of the radially extending connecter 12 and is readily adapted to be rotated with the rotor assembly 33 for coupling and connection with the center conductor 25 of the radially extending connecter 14, or with similar parts of the radially extending connecter 13, Figure 1. Since the alignment of these parts is relatively critical, the system is provided with an accurate aligning system including a detent-type mechanism indicated generally at 40, as shown in top elevation in Figure 2 and in side elevation in Figure 3. For proper operation of the detent system for aligning the switch rotor assembly 33 a detent gear-type wheel 41 is concentrically fixed to a drive shaft 42 which is also fixed to the switch rotor assembly 33 for rotatably driving the switch rotor assembly 33 and the detent gear-like wheel 41. The detent gear wheel 41 is provided with a set of detent notches, or grooves 43 separated by radially extending teeth or the like 44. A pair of detent roller retaining, positioning and biasing arms 45 and 46 are disposed symmetrically on opposite sides of the detent wheel 41 radially outwardly therefrom and pivotally arranged for movement toward and away from the detent wheel 41 in the plane of the detent wheel. The arms 45 and 46 are pivotally secured to the switch housing 17 through shouldered studs or the like 47 and 48. Each of the arms 45 and 46 also carries a detent roller or pin 49 and 50, respectively for seating in a detent groove 43 at diametrically opposed positions on the detent wheel 41. The arms are also biased for retaining the detent roller or pins 49 and 50 in proper seating engagement within the appropriate grooves 43 therefor by biasing tension springs or the like 51 and 52, respectively, hooked to the lever arms 45 and 46 at the free end of each and to the pivot posts 47 and 48 at the opposite ends of each so that the biasing spring 51 is hooked to the free end of the lever arm 45 and to fixed post 48 while the biasing spring 52 is hooked to the free end of the lever arm 46 and the fixed post 47, thereby biasing the same toward the center of the shaft 42 and the center of the detent wheel 41.

Numerous forms and variations of detent systems for accurately aligning the center conductor of the rotor assembly with the center conductor of the radial connecter to which it is to be coupled are available and they need not take the form of the preferred detent aligning system illustrated. It is important, however, that the detent aligning systems employed have a detent groove which is in proper position with respect to the detent aligning member, the roller or pin employed, for proper accurate alignment of the center conductor of the rotor assembly. In the system illustrated it is important that the detent wheel 41, shown as having twelve teeth and twelve grooves, have diametrically opposed grooves such as the grooves 43 for seating of the rollers 49 and 50 therein positively when the center conductor 37 of the rotor assembly 33 is in accurate positive coupling alignment with the proper center conductor to which it is to be coupled immediately. Thus, for example, if the coaxial switch system is provided with six regularly disposed radially extending connecters such as connecters 12, 13 and 14 as shown in Figure 1, then the detent wheel 41 is so secured to the drive shaft 42 that a pair of diametrically opposed detent seats 43 are in proper matched alignment with the rotor 33 for accurately positioning the same. In this particular arrangement rotation of the roller through 60° for movement of the center conductor of the rotor from one radially extending connecter to an adjacent radially extending connecter in rotation of the shaft through 60° and rotation of the detent wheel through 60° thus moving the wheel by a space of two detent seats for seating of the detent positioning rollers 49 and 50 in proper grooves therein. It will be noted that each of the grooves being regularly spaced is provided with an arc length of about 30° between adjacent teeth. By the provision of this spacing any misalignment of the rotor assembly 33 within 15° more or less than its proper angular position will be corrected by the detent system since the biasing springs 51 and 52 will urge the detent rollers 49 and 50 inwardly with sufficient force to rotate the detent wheel 41 and the shaft 42 and thereby the rotor assembly 33 through the appropriate angle for accurate and proper positive feeding of the rollers 49 and 50 within the recesses or grooves 43.

It will be understood, of course, that in such a system as this the wheel need not be provided with twelve teeth and twelve grooves for a 30° step-by-step movement thereof, but it may be provided with a number of grooves computed from the number of radially extending coaxial switch connecters for permitting an angular displacement in the "sloppy" coupling of more or less than the 15° variation allowed by the detent system of the present system. Numerous other variations and modifications may be made such as are desired, but the system immediately hereinabove described is preferred.

From the above it will be seen that the detent gear wheel 41 and the switch rotor assembly 33 are corotatable and fixed to a drive shaft 42. This drive shaft is connected to a rotary drive power system, indicated generally at 55, for driving the same. The rotatable power drive system 55 preferably includes a motor 56, hereinafter further described, coupled to the drive shaft 42 through a gear reduction assembly including a gear 57 on the motor shaft 58 engaging a relatively larger gear 59 on a supplementary shaft 60 also carrying a relatively smaller gear 61 in driving relation with a relatively large gear 62 carried on the drive shaft 42. Since the motor 56 is preferably a very high speed motor having an extremely fast response time, this gear reduction system is preferred to direct coupling of the motor shaft 58 and the drive shaft 42 for the coaxial switch and detent operator system.

It should be noted at this point that one other variation available for modification of the detent system 40 is to gear the detent wheel 42 to one of the rotatable driven members and to appropriately arrange the detent arms, rollers, etc., thereabout. So, too, it is not critical that the drive shaft 42 be concentrically fixed with the switch rotor 33, but it, too, may be otherwise coupled thereto as through a gear arrangement or belt and pulley arrangement if the same is found desirable.

In this embodiment of the present invention, there is also included a motor control assembly 65 having portions thereof connected to one of the rotatable members such as the drive shaft 42 for corotation therewith. This control system 65 has been most diagrammatically illustrated in Figure 2, but is shown in various preferred embodiments thereof more schematically illustrated in Figures 4, 5 and 6. The first of these systems forming one of the preferred embodiments of the control system of the present invention is illustrated in schematic form in Figure 4.

In this system the motor 56 is indicated as preferably having three terminals marked for "clockwise" rotation, "counterclockwise" rotation and "line." The line terminal L is connected to one side of a power supply line including power supply leads 63 and 64. The power supply available to the motor 56 may be either alternating current or direct current as desired, depending upon the character of the motor 56 employed. The system of the present invention is operable with alternating current or direct current and is, therefore, what may be termed a "universal" system.

The control system 65 is illustrated in Figure 4 as including a disk or the like 66 secured to the shaft 42 for rotation therewith. Adjacent to the periphery of the disk 66 a conductive strip 67 is carried on one side thereof and a conductive strip 68 is carried on the other side thereof also adjacent the periphery of the disk 66. This arrangement of the disk 66 and the conductive strips 67 and 68 are in other forms frequently known as wafer-type switch system, most other types of wafer switch systems include only conductive media on one side of the disk, but it may be conductive on both sides of the disk as herein shown. It is not the wafer arrangement itself which is critical of the present invention, but the precise arrangement of the conductive members and their operative functional form in conjunction with other features of the present invention.

The disk switch contactor element 67, visible on the face of the disk 66, as illustrated, extends for an arc length of about 180° or slightly more, and the disk switch contact plate element 68, invisible on the back face of the disk carrying member 66, also extends for an arc of about 180° or slightly more and is so positioned with respect to the front face contact member 67 that the two overlap somewhat at one end of each thereof and still more importantly are provided with a gap, indicated generally at 69 therebetween at the other end of each thereof. The front face connector element 67 is contacted by a brush-type contact element 70 electrically connected to the counterclockwise terminal of the motor 56 while the back face, invisible, switch element 68 is contacted by a brush-like element 71 electrically connected to the clockwise terminal of the motor 56.

A plurality of other brush-like contact elements 72, 73 and 74 are radially disposed about the wafer disk switch element carrying member 66 and are angularly positioned to correspond to the angular positions of the radially extending connecters such as the connecters 12, 13 and 14, respectively of the coaxial switch system 10 and in this preferred system the contact brush-like elements 72 correspond in angular position to the connector 12, the brush-like contacter element 73 corresponds to the connecter 13 and the brush-like contacter element 74 corresponds in angular position to the connector 14. The brush-like contacter 72 slidingly contacts the switch element 67, the brush-like element 74 slidingly contacts the switch member 68 and the contact member 73 includes a pair of brush-like elements 73a and 73b disposed on opposite sides of the rotary disk 66 for contact with either the conductive member 67 or the conductive member 68 as further described. Each of these elements 72, 73 and 74 is electrically connected to a multiple throw single pole switch 75, the switch throw-arm 76 of which is connected to the opposite side of the power supply line 64.

As stated, the switch contact brush-like elements 72, 73 and 74 are connected to individual terminals of the multiple throw single pole switch 75, so that connection of the arm 76 of the switch 75 with, for example, the brush-like element 72 will complete the power circuit through the brush 72, the contact plate 67, the brush-like element 70, the counterclockwise rotational connection of the motor 56 onto the line 63. Similarly, connection of the switch arm 76 with the terminal of the switch 75 connected to the brush-like contact 74 will complete the electrical circuit through the clockwise terminal connection to the motor 56 between the lines 63 and 64. This connection description, however, holds true only under certain predescribed conditions of angular position of the rotary disk 66 and the switch elements 67 and 68, respectively.

Before describing the operation of this preferred control system embodying the principles of the present invention, it should be noted that there has also been illustrated in Figure 4, brush-like contact elements 72a and 74a connected to the brush-like contact elements 72 and 74 and positioned to the connection thereto and the adjacent connection thereto. These brush-like contact elements 72a and 74a are merely illustrations of other possible positions for the brush contact elements 72 and 74 and are illustrative as being at 180° divergence and each 90° in angular displacement from the brush contact element combination 73. This arrangement would be used if the particular coaxial switch system had radially disposed connecter elements which were say, for example, 90° displaced between adjacent elements. This type of coaxial switch has not been illustrated, but has been described above as one possible variation among the numerous variations available for the coaxial switch system. It will be understood that the several contact elements are not critically spaced as described, but their placement is critical only with regard to the particular coaxial switch with which they are to be employed, so that one contact element is accurately angularly positioned with respect to and to correspond to an individual of the radially extending connecters of the coaxial switch. That is, one brush-like contact element such as the elements 72, 73 and 74 will be accurately angularly positioned for each of the radially disposed connecter elements such as the elements 12, 13 and 14 of the switch system 10 of Figures 1 and 2.

The operation of this system embodying the principles of the present invention provides the coaxial switch system with a rotor drive supply and control system readily adapted to operate the rotor such as the rotor 33 of the coaxial switch system 10 to rotate the same through the least possible angle for removing the connection of the rotor from one of the radially extending connecters to another of the same. As described, in former systems, rotation was had in but a single angular direction so that removal of the rotor conductor from the, for example, connecter 14 to the connecter 13 might be accomplished in a counterclockwise direction which was the most efficient direction for the same, but that removal of the rotor switch connecter elements from the connecter 13 to the connecter 14 would also have to be accomplished in a counterclockwise direction, thereby necessitating a rotation of more than 180° and an undue delay in the switching from said connecter 13 to said connecter 14. By the system of the present invention, however, rotation of the rotor is accomplished in an appropriate direction, either clockwise or counterclockwise, for rotation in the most efficient direction to permit only rotation through the smallest possible angular arc.

In the position shown, therefore, in Figure 4, it is presumed that the center conductor of the rotor assembly is aligned in connection with the center conductor of the radially extending connecter 13 of the switch system of Figures 1 and 2. To effect rotation of the same for connection with the center conductor of the radially extending connecter 22, the single throw-on switch 76 of the multiple throw single pole switch 75 is connected to its appropriate contact terminal for electrical connection of the line 64 with the brush-like contact 72. This will energize the counterclockwise circuit of the motor 56 and effect rotation of the drive shaft 42 and the disk 66 and its accompanying contact switch elements 67 and 68 for rotation thereof in a counterclockwise direction. This counterclockwise movement will be continued until the switch contact element 67 rides out from under the brush-like contact 72. Thereafter, rotary momentum of the motor 56 will carry the switch disk 66 somewhat further angularly, but will rapidly be slowed by the detent mechanism 40. Should the rotor assembly 33 of the coaxial switch system 10 fail to stop in proper precise alignment, the detent mechanism 40 will properly align the same. It is in accordance with the principles of the present invention that in this system the momentum of the motor 56 will not carry the system beyond the 15° displacement therefor.

At this time the rotor switch disk 66 has been so angularly displaced that the connection between the lines 63 and 64 through the counterclockwise terminals has been broken by disconnection of the rotating switch plate 67 from the brush-like contact connecter element 72. At the same time, the disk 66 is so rotated as to connect the switch brush-like element 73b into contact with the underside conductor plate 68 and rotation has not been carried sufficiently far to carry the conductor plate 68 beyond contact with the switch element brush-like member 74 so that the brush-like element 74 remains in contact with the clockwise connecter plate 68 and in connection with the clockwise brush-like element 71 connecting the same to the clockwise terminal of the motor 56. Connection now of the switch pole arm 76 with either the terminal connecting the same to the brush-like element 73, or with the brush-like element 74, will cause clockwise rotation of the motor 56 in the shaft 42 and the disk 66 carrying the connecter plates 67 and 68 to an appropriate position for the gap 69 about ether of those two brush-like elements depending upon which one the electrical circuit has been connected to in accordance with the principles of the present invention. If electrical circuit had been connected to the brush-like element 74, then clockwise rotation would have been had until the center conductor of the rotary assembly made accurate connection with the center conductor of the connecter 14. Once the system is in this position, then the switch may be relocated at connection with either the connecter 12 or 13 through counterclockwise rotation since the brush-like element 73 is readily adapted to connect either with the conductor plate 67 or the conductor plate 68 and the brush-like element 72 is provided to connect with the counterclockwise element connecting plate 67.

It will be seen from the above that there is now provided in accordance with the principles of the present invention an extremely efficient system for effecting rotation of the rotor of the power driven system most rapidly from one position to another therefor quite accurately through the smallest possible angular displacement thereof. The final accurate alignment of the system will, of course, be made by the detent system if the switching system does not stop its rotation in precisely the proper position therefor. However, the system is readily adapted to fairly accurately position the center conductor and will position the same most efficiently within the 15° area followed therefor by the detent system 40. Other modifications of this system may, of course, include braking arrangements and these will be further described hereinbelow in conjunction with other preferred embodiments of the present invention such as those illustrated in Figures 5 and 6. Attention will first be directed to the system of Figure 5.

In the power drive mechanism and control system of Figure 5, a motor mechanism 56' is controlled through operation and energization by a control switch system 65'. The motor system 56' includes a "universal" motor having an armature 56'a of the wound rotor type and a pair of field coils 56'b and 56'c which are so arranged about the rotor 56'a so that the motor assembly may be connected either as a series motor, or as a separately excited generator system as desired. Preferred connection, therefore, will be described in connection with the switch system 65' and its operating features with regard to the motor system 56'.

The switch system 65' includes a rotary switch assembly having a pair of plates 67' and 68' arranged for corotation on a common disk or the like with a gap 69' between one end of each thereof. Employed with a coaxial switch system such as the systems of Figures 1 and 2 these substantially semi-circular plates may be on the same side of the rotating disk which carries the same (not shown), but are not in contact with each other and each arc slightly less than 180° so that they are provided with a second gap between the opposite end of each thereof which gap is unimportant except that the provision of the same negatives any possibility of contact between the two conductive plates 67' and 68'. Brush-like contact elements 72', 73' and 74' are radially disposed thereabout and angularly separated so that each corresponds in accurate angular position with a radially extending connecter of the coaxial switch system which the same is to operate as a preferred example of the utilization of this embodiment of the invention. Additional contact elements 70' and 71', of brush-like character, contact the substantially semi-circularly configurated contact plates 67' and 68', respectively, continuously in all positions of the same. Each of the brush-like coaxial switch connector station elements 72' and 73' and 74' are connected individually to the second contact elements 80, 81 and 82 identically angularly arranged about another rotary contact plate 83 having a pair of ears 85 and 86 thereon rotatable together with the contact elements 67 and 68 and may, if desired, be disposed on the rear surface of the disk (not shown), carrying the same. This arrangement may be very much like the arrangement of Figure 4 wherein conductor contact elements are disposed on opposite sides of the wafer switch disk 66; in Figure 5 the corotation of the contact plates 83 carrying ears 85 and 86 with the rotatable contact elements 67' and 68' has been shown by a dashed mechanical coupling illustration schematic line indicated at 84. As stated, these rotatable elements may be on the same disk or they may be on separate disks which are corotatable along with the drive shaft of the motor system 56', the actual drive shaft for the coaxial switch rotor such as the rotor 33 of the coaxial switch system 10.

The rotary conducting plate 83 may be known as the brake conducting plate and is connected via a brush-like contact element 83a to a brake relay B and one side of the electrical power supply energy line 63'. The ears on the rotary contact plates 83 are comparably spaced to the gap 69' so that they will have adjacent edges lying on opposite sides of the contact member among the contacts 80, 81 and 82 which is appropriate for the position of the rotor of the coaxial switch system 10. The brush-like contact elements 70' and 71' are also connected to the power supply line 63' through relays such as the forward (counterclockwise) relay F and reverse (clockwise) relay R, respectively. Further, each of the brush-like contact elements 72', 73' and 74' is together with the contact elements 80, 81 and 82 connected respectively to individual pole position terminals of a multiple throw single pole switch 75'. The arm 76' of the pole switch 75' is connected to the other side of the supply line 64'.

Each of the forward and reverse relays F and R, respectively, have a plurality of relay contacts and at least three thereof, $F_1$, $F_2$ and $F_3$ and $R_1$, $R_2$ and $R_3$, respectively, shown. On the other hand, the brake relay B need have only two relays contact sets $B_1$ and $B_2$. The relay contacts $F_1$ and $R_1$ are normally closed contact sets and are in series with each other and in series with the brake relay B and brush-like contact element 83a in continuous contact with the brake relay contact plate 83 irrespective of the angular position of the plate 83. The remainder of the several relay contact sets are normally open.

The several sets of switch relay contacts $F_2$ and $F_3$, $R_2$ and $R_3$, $B_1$ and $B_2$ are arranged about the power drive motor system 56' for energization of the motor for clockwise or counterclockwise rotation thereof selectively and for dynamic braking of the motor system. For dynamic braking of the motor the relay contact sets $B_1$ and $B_2$ are connected in series with limiting resistors 87 and 88, respectively, since when the brake relay B is energized the armature 56'a will be shorted by the brake relay contacts $B_1$ and the limiting resistor 87 while the fields 56'b and 56'c are connected together through the brake relay contact sets $B_2$ and the limiting resistor 88. The relay contact sets $F_2$ and $F_3$ are connected in the system so that the fields 56'b and 56'c will be in series with each other and in series with the motor armature of the wound rotor type 56'a while the reverse, clockwise, relay contacts $R_2$ and $R_3$ are also so connected that the armature 56' will be in series with the fields 56'b and 56'c, but so that current through the armature 56'a will be in a reverse direction with respect to the direction thereof when the relay contact sets $F_2$ and $F_3$ are closed.

In operation the system of the present invention as embodied in schematic illustration in Figure 5 provides a most efficient bidirectional rotor control and power drive system operable to move said systems as coaxial switch rotors in the most efficient, least movement direction, manner and further operable to dynamically brake the same for extremely accurate positioning thereof. The system as illustrated in Figure 5 is shown with the presumption that the coaxial switch rotor has its center conductor in contact with the center conductor of the center of three angularly displaced radially extending connecters such as in contact with the center conductor of the connecter 13 of the coaxial switch system 10 of Figures 1 and 2. While in this position all of the relays, the relays F, R and B are deenergized. To reposition the coaxial switch rotor center conductor to alignment with the center conductor of the radially extending connecter 12, the switch arm 76' need only be thrown to connect the line 64' to the brush-like contact element 72'. This will also connect the line 64' to the brush-like element 80. The passage of current through the brush-like contact element 72' and the contact plate 67' will continue through the contact element 70' and the counterclockwise forward relay F to the power supply line 63'. Energization of the relay F will close the contact relay sets $F_2$ and $F_3$ and open the relay contact set $F_1$. In this manner upon closure of the relay contact sets $F_2$ and $F_3$ the motor system will be energized and current will pass from the line 64' through the field coil 56'b, the armature 56'a and the field coil 56'c successively in series to the line 63', thereby effecting counterclockwise rotation of the rotor 56'a.

The counterclockwise rotation of the motor system will be transmitted to the several rotary contact elements 67', 68' and 83 for counterclockwise rotation thereof, thus moving the gap 69' in a counterclockwise direction until the contact plate 67' passes out from brushing contact with the brush-like contact element 72'. In the meanwhile, the contact element 85 on the rotary brake contact plate 83 has come in contact with the brush-like contact element 80, thereby completing the circuit for energization of the brake relay contact B except for the open contact $F_1$.

Since the gap 69' between the forward contact plate 67' and the reverse contact plate 68' is greater than the gap between the ears 85 and 86 of the brake contact plate 83, when the forward contact plate 67' passes out from brushing contact with the brush-like contact element 72', the brake relay B will be energized through deenergization of the relay F and closure of the relay contacts $F_1$ while the brush-like contact element 80 is still in contact with the ear 85. At this time, the contacts $F_2$ and $F_3$ will open and the contacts $B_1$ and $B_2$ will close. Closure of the contacts $B_2$ will permit continued excitation of the fields 56'b and 56'c through the contacts $B_2$ and the limiting resistor or like element 88. At the same time the wound rotor 56'a will be permitted a high circulating current through the same and through the closed contacts $B_1$ and limiting resistor element 87. This circulating current will be in such a direction as to present itself as a heavy load on the motor assembly, thereby dynamically braking the same and bringing the rotor 56'a to a quick stop of diminishing deceleration rate of slowing down. Upon stoppage of the rotor assembly, if the coaxial switch contacts are not in proper precise alignment, then the detent system such as the system 40 of the coaxial switch 10 will bring the same into precise alignment.

The selected brush element such as 73' together with the contact plates 67' and 68' and the gap 69' therebetween thus constitutes switch means responsive to the drive mechanism including mechanical coupling 84 reaching a predetermined position in advance of a preselected angular position to actuate braking means such as the dynamic braking circuit controlled by relay B. It will be noted that this switch means is responsive to the drive mechanism reaching a predetermined position in advance of the preselected position in either direction of rotation of the drive mechanism by virtue of the symmetry of the gap 69' with respect to the selected brush element such as 73'.

When the coaxial switch is in precise proper alignment as it should be, the gap between the ears 85 and 86 on the brake relay contact 83 will surround the brush-like contact element 80 and the brake relay B will be deenergized through disconnection of the brush-like contact element 80 from the ear 85.

The selected brush element such as 81 together with the ears 85 and 86 and the gap therebetween thus constitutes switch means controlling actuation of the braking means, the switch means being operative in conjunction with the deenergization of relay F or R to complete a brake actuating circuit for energizing relay B and being operative in response to the drive mechanism including coupling 84 reaching a preselected position (with brush element 81 between ears 85 and 86) to deactivate the braking means.

If, by chance, the inertia of the motor system was so great as to carry the rotary brake contact 83 beyond the proper positioning of the contact element 80 in the gap between the ears 85 and 86, then the ear 86 will contact the element 80, thus reenergizing the brake relay B and continuing the dynamic braking effect as long as it is necessary. Upon stoppage the detent system 40 or whatever like system is provided will return the coaxial switch from its "sloppy" connection to positive proper precise alignment therefor.

There was described above the manner of operation for this system for counterclockwise, forward rotation of the system to move the center conductor of the rotor assembly 33 from connection with the radially extending connecter 13 to connection with the radially extending connecter 12. To reconnect the center conductor of the rotor assembly 33 with the radially extending connecter 13 or with the center conductor of the radially extending connecter 14, the switch arm 76' is thrown to its appropriate position to connect the power supply line 64' to either the brush-like contact element 73' or the brush-like element 74' as properly desired. If the radially extending connecter 14 is the one to which it is desired to have the axial connector 11 connected, then the switch arm 76' is connected to the proper pole position for connecting the power supply line 64' to the contact brush-like element 74'.

In this position of the selector switch arm 76', the relay R will be energized closing the contacts $R_2$ and $R_3$ and opening the contacts $R_1$. Closure of the contacts $R_2$ and $R_3$ will permit energization of the motor system 56' with current passage from the supply line 64' through the field coil 56' and through the closed contacts $R_2$ to the wound rotor 56'a and upwardly therethrough, as illustrated in the drawing, to connection and through the relay contacts $R_3$ and through the field coil 56'c to the other side of the supply line 63'. This energization of the motor system 56' will effect clockwise rotation of the same and of the rotary switching plates 67' and 68' and 83 until the gap 69' between the forward contact plate 67' and the reverse contact plate 68' surrounds the contact brush-like element 74'. The relay R will then be deenergized and closure of the relay $R_1$ will permit energization of the brake relay B through the ear 86 and brush-like element 82, dynamically braking the motor by opening the relay contacts $R_2$ and $R_3$ and closure of the relay contacts $B_1$ and $B_2$.

The operation of this system is substantially identical in counterclockwise direction to the manner of operation thereof in the clockwise direction except that the direction of operation is exactly reverse to that described above for counterclockwise rotation. It will be understood, however, that through the operation of this system as described and proper positioning of the selector switch 75 will effect efficient movement of any rotatable system, such as a coaxial switch having preselected stations about its periphery for accurate alignment therewith individually and selectively. Operation of this system will accomplish repositioning from one station to another station through high speed angular positioning via movement through a minimum arc in the most efficient direction.

Another system for effecting this efficient type of switching rotation for proper angular positioning through displacement of a minimum arc length is illustrated schematically in Figure 6 wherein there is illustrated a motor drive system 56" substantially identical to the system 56' described above in conjunction with Figure 5 including a wound rotor armature member 56"a and field coils 56"b and 56"c. Also included in this system are relay contact sets $R'_2$ and $R'_3$, $F'_2$ and $F'_3$ and $B'_1$ and $B'_2$ in identical arrangement and connection as described above including resistor limiting elements 87' and 88' in series with the contacts $B'_1$ and $B'_2$. The switching system 65" varies somewhat from that described above, although it includes two corotatable switch contact plates 67" and 68" mechanically coupled for corotation with a brake relay contact plate 83″. These corotatable switch contact plates 67″ and 68″ and 83″ may be mechanically coupled together as indicated by the schematic mechanical coupling line 84″ or they may be so arranged that the brake relay contact disk 83″ is on the back face of the disk carrying the other two.

The power drive mechanism and control system of Figure 6 also includes a selector switch 75″ of multiple pole single throw character having a single pole arm 76″ connected to one side of the supply line 64″. The selector switch 75″ differs from the selector switches 75 and 75′ in that it is preferred that in the arrangement of Figure 6 it have a greater number of switch points such as, for example, six switch points. Also, the brush-like elements surrounding the forward relay contact plates 67″ and a reverse relay contact plate 68″ and the brake relay contact plate 83″, are increased in number accordingly. Thus, brush-like contact elements 89, 90 and 91 are provided about the two relay contact elements 67″ and 68″ and additional brush-like contact elements 92, 93 and 94 are provided about the brake relay contact plate 83″. With this arrangement one may use a six-pole coaxial switch which would be a doubling of the number of radially extending connecters of the coaxial switch 10 of Figures 1 and 2. This doubling may be provided by a symmetrical second half section for the coaxial switch system 10 as is obvious from the drawings of Figure 1. It will be understood, of course, that these additional brush-like contact elements 89 through 94 are supplementary to the other brush-like contact elements 70″, 71″, 72″, 73″, 74″, 80″, 81″ and 82″ corresponding to the several similarly numbered contacts of Figures 4 and 5, in particular, those of Figure 4.

The forward relay contact plate 67″ and the reverse relay contact plate 68″ vary somewhat from the configuration shown therefor in Figure 5 and in the embodiment of the present invention illustrated in Figure 6 are complete rings for continuous contact with the forward and reverse relay contact brush elements 70″ and 71″, respectively, and further are provided with enlarged contact areas with gaps 69″ between one end of each of the enlarged portions and the other end of each of the enlarged portions being also separated. It will be noted as illustrated that these rings 67″ and 68″ do not contact each other, but are merely provided for corotation about the center of each thereof, a superimposed center. These rings are also arranged so that the contact elements 72″, 73″, 74″, 89, 90 and 91 are continuously in contact with one or the other of these rings except for the particular one which corresponds to the particular position of the coaxial switch rotor which has contact with a selected radially extending connecter.

By this arrangement of forward contact plates 67″ and reverse contact plates 68″ and this described configuration for each thereof as shown in the drawings, complete revolution is permitted of the same and absolutely complete universal connection and switching is permitted. The forward contact plate 67″ is continuously connected through the contact 70″ to the forward relay F′ and the reversed contact plate 68″ is continuously connected to the brush-like contact 71″ to the reverse relay R′ irrespective of whatever angular position the plates 67″ and 68″ may assume.

As a matter of detail, the brake relay contact plate 83″ is provided with radially extending ears 85″ and 86″ having a gap therebetween of an arc length less than the gap 69″ between the enlarged areas of the forward relay contact plate 67″ and the reverse relay contact 68″. A brake relay brush-like contact element 83″a is arranged to make continuous contact with the brake relay contact plate 83″ irrespective of the angular position of the ears 85″ and 86″ and to complete the circuit therefrom to the brake relay B′ and the normally closed contacts $F_1'$ and $R_1'$.

The operation of this particular embodiment of the present invention may be better understood if we assume that the coaxial switch which it is to operate has six pole positions—that is, six radially extending connector positions indicated as pole positions 1, 2, 3, 4, 5 and 6 corresponding to the positions of the brush-like connectors 72″, 73″, 74″, 89, 90 and 91, respectively. With this small presumption in mind for purposes for better identification, our drawing has been marked in accordance therewith at both the forward and reverse contact plates and further at the selector switch 75″ for easy and simplified pole position indication and identification.

As the system is shown on the drawing, the coaxial switch is accurately positioned at pole position 2 to connect the coaxial switch to, for example, pole position 6. The selector switch arm 76″ is moved to pole position 6 and since it is connected to the brush-like contactor 91 at pole position 6, the power circuit is completed from one side of the line 64″ through the selector switch and through the forward rotatable contact plate 67″ to the brush-like contactor 70″ and the forward relay F′ and the line 63″. This energizes the relay F′, thereby opening the contacts $F_1'$ and closing the contacts $F_2'$ and $F_3'$. Thereby, the motor drive system 56″ is energized and current passes through the fields 56″b and 56″c through the closed contacts $F_2'$ and $F_3'$, and through the wound rotor 56″a in series connection. Energization of the motor system 56″ in this manner is effective to cause counterclockwise rotation of the system, and the switch system 65″ correspondingly rotates in a counterclockwise direction until the gap 69″ lies about the contact arm 91 at pole position 6. When the forward relay contact arm 67″ has its edge pass out from under contact with the brush-like contact element 91 at pole position 6, the forward relay F′ is deenergized, thereby closing the contacts $F_1'$ and opening the contacts $F_2'$ and $F_3'$. At the same time, the ear 85″ on the brake relay contact plate 83″ is in contact with the brush-like element 94 at pole position 6 of the brake relay switch assembly and the brake relay is energized, thereby closing the contacts $B_1'$ and $B_2'$.

In the same manner which was described above, the closure of the brake relay contacts initiates dynamic braking of the motor system 56″, thus quickly stopping the coaxial switch system at pole position 6 therefor. When the coaxial switch is accurately aligned at pole position 6 the ears 85″ and 86″ lie on opposite sides of the brush-like contact member 94 and out of contact therewith, thereby leaving a situation wherein, as desired, none of the relays R′, F′ and B′ are energized. If it is then desired to move the switch to pole position 4, the pole arm 76′ will be moved to pole position for the selector switch 75″ and forward, counterclockwise, rotation of the coaxial switch and the motor switch system controlling the same will be effected until the same is properly aligned. This counterclockwise rotation will be continued by virtue of contact of the brush-like contact arm 89 at pole position 4 with the forward relay contact plate 67″ since that contact plate has been rotated to approximately 120° in a counterclockwise direction from the position shown therefor in Figure 6 when the switch system was moved from pole position 2 to pole position 6. Counterclockwise rotation may be effected to move the switch to pole positions 5 or 6 when the switch is a pole position 4 through this preferred embodiment of the present invention.

It will be noted that movement of the switch system from pole position 2 to pole position 5 will be effected in a forward, counterclockwise, direction. This is because it has merely been selected that that should be direction of rotation therefor since the two are 180° apart. This is not critical, however, and it could have equally as efficiently been decided that the enlarged section of the contact plate 68″ should have a greater arc length than the arc length of the enlarged area of the forward, counterclockwise, contact plate 67". With employment of this embodiment of the present invention any desired number of pole positions may be employed and irrespective of the desired switching from one pole position to another, the selector system will always take the shortest possible angular path therebetween. That is, when the switch is at pole position 2, the switch will move counterclockwise to reach pole positions 1, 6 and 5 and clockwise to reach pole positions 3 and 4; with the switch at pole position 6, the switch will move counterclockwise to reach pole positions 1 or 2 and counterclockwise to reach pole positions 5, 4 or 3. It will be seen that this is a most efficient multiple bidirectional switching system and is further provided with dynamic braking in accordance with the principles of the present invention for accurate positive alignment of the switch. As described, if the system does not reach its absolute accurate position, then the detent mechanism, such as the mechanism 40 of Figure 2 will bring it into absolute accurate alignment.

It will also be understood that numerous variations and modifications may be made without departing from the true spirit and scope of the novel concepts of the present invention; and, we, therefore, do not wish to be limited except as the appended claims define the present invention.

We claim as our invention:

1. A drive and positioning system for a rotary member to be selectively accurately angularly positioned at any one of a plurality of angularly disposed stations, comprising, a drive motor having an armature and a field winding, a switch system arranged for controlled rotation with said armature, and a plurality of relay members selectively energized through said switch system each to connect said armature and the same field winding in series for selective rotation in opposite directions, and to connect said armature for dynamic braking thereof when said switch system reaches a preselected angular position.

2. A drive and positioning system for a rotary member to be selectively accurately angularly positioned at any one of a plurality of angularly disposed stations, comprising, a rotational power drive mechanism including a field winding, resistance means, electrical power source means connected with said mechanism for reversible energization of the same to rotate the mechanism in opposite directions, and a switch and relay system controllably interconnected between said means and said mechanism to selectively control the direction of energization and rotation of said mechanism and operable to connect said resistance means in series with said field winding, said switch and relay system including a pair of disc switch conductive elements corotatable with said mechanism, a separate brush element in continuous contact with each of said conductive elements, individual relays having contacts connected to reversibly energize said mechanism, a plurality of other brush elements selectively connectible with said means and positioned along said conductive elements in positions corresponding to the angularly disposed stations whereby connection of said means with one of said other brush elements causes energization of said mechanism for rotation thereof in a direction of least angular movement to disconnect the said selected other brush from the associated conductive element, and means responsive to predetermined angular positions of the drive mechanism for connecting said resistance means in series with said field winding.

3. A drive and positioning system for a rotary member to be selectively accurately angularly positioned at any one of a plurality of angularly disposed stations, comprising, a rotatable power drive mechanism including a field winding, resistance means, electrical power source means connected with said mechanism for reversible energization of the same to rotate the mechanism in opposite directions, a switch and relay system controllably interconnected between said means and said mechanism to selectively control the direction of energization and rotation of said mechanism, said switch and relay system including a pair of disc switch conductive ring elements corotatable with said mechanism, a separate brush element in continuous contact with each of said conductive elements, individual relays having contacts connected to reversibly energize said mechanism and to connect said field winding in series with said resistance means, a plurality of other brush elements selectively connectible with said means and positioned along said conductive elements in positions corresponding to the angularly disposed stations whereby connection of said means with one of said other brush elements causes energization of said mechanism for rotation thereof in a direction of least angular movement to disconnect the said selected other brush from the associated conductive element, and a further conductive element rotatable with said drive mechanism and controlling connection of said resistance means in series with said field winding.

4. A drive and positioning system for a rotary member to be selectively accurately angularly positioned at any one of a plurality of angularly disposed stations, comprising, a rotational power drive mechanism, electrical power source means connected with said mechanism for reversible energization of the same to rotate the mechanism in opposite directions, a switch and relay system controllably interconnected between said means and said mechanism to selectively control the direction of energization and rotation of said mechanism, said switch and relay system including a pair of conductive elements codisplaceable with said mechanism, a separate brush element in continuous contact with each of said conductive elements, individual relays having contacts connected to reversibly energize said mechanism, a plurality of other brush elements selectively connectible with said means and positioned along said conductive elements in positions corresponding to the angularly disposed stations whereby connection of said means with one of said other brush elements causes energization of said mechanism for rotation thereof in a direction of least angular movement to disconnect the said selected other brush from the associated conductive element, dynamic braking relay means connected to be energized upon disconnection between said selective other brush and the associated conductive element, and a further conductive element rotatable with said drive mechanism and controlling actuation of said dynamic braking relay means.

5. A drive and positioning system for a rotary member to be selectively angularly positioned at any one of a plurality of stations, comprising, a rotary drive mechanism for rotation to selectively position the rotary member at the stations, braking means for operative connection with said drive mechanism, first switch means controlling connection of said braking means with said drive mechanism and responsive to preselected angular positions of said drive mechanism to disconnect said braking means from said drive mechanism when the rotary member reaches each of said stations, and second switch means controlling connection of said braking means with said drive mechanism and responsive to the drive mechanism reaching a predetermined position in advance of each of said preselected angular positions thereof to connect said braking means with said drive mechanism.

6. A drive and positioning system for a rotary member to be selectively angularly positioned at any one of a plurality of stations, comprising, a rotary drive mechanism for rotation to selectively position the rotary member at the stations, braking means for operative connection with said drive mechanism, first switch means controlling connection of said braking means with said drive mechanism and responsive to preselected angular positions of said drive mechanism to disconnect said braking means from said drive mechanism when the rotary member reaches the selected station, second switch means controlling connection of said braking means with said drive mechanism and responsive to the drive mechanism reaching a predetermined position in advance of each of said preselected angular positions thereof to connect said braking means with said drive mechanism, means whereby said drive mechanism is actuated for angular displacement in a direction for least movement toward said preselected angular positions, and means whereby said second switch means is responsive to the drive mechanism reaching a predetermined position in advance of at least one of said preselected angular positions in either direction of approach to said one preselected angular position.

7. A drive and positioning system for a rotary member to be selectively angularly positioned at any one of a plurality of stations, comprising, a rotary drive motor for rotation in respective opposite directions including an armature, reversible energizing control means operable to connect said drive motor for angular displacement in a direction for least movement between angular positions thereof and comprising forward and reverse relay means having first and second forward and reverse contacts in series with said armature for controlling energization of said armature in forward and reverse senses respectively, means responsive to the position of said drive mechanism in relation to the selected angular position for selectively energizing said forward and reverse relay means for rotation of the motor in the direction of least displacement to the selected angular position, means responsive to the rotary member reaching a predetermined position in advance of the selected station to deenergize the selected relay means, braking relay means for controlling braking of said rotary member, means responsive to deenergization of said forward and reverse relay means controlling the energizing circuit for said braking relay means, and means responsive to the rotary member reaching a predetermined position in advance of the preselected station for completing the energizing circuit for said braking relay means after said forward and reverse relay means have been deenergized to actuate said braking relay means.

8. A drive and positioning system for a rotary member to be selectively angularly positioned at any one of a plurality of stations, comprising, a rotary drive member for rotation in respective opposite directions including a field winding and an armature, reversible energizing control means operable to connect said drive motor for angular displacement in a direction for least movement between angular positions thereof and comprising forward and reverse relay means having first and second forward and reverse contacts in series with said armature for controlling energization of said armature in forward and reverse senses respectively, means responsive to the position of said drive motor in relation to the selected angular position thereof for selectively energizing said forward and reverse relay means for rotation of the motor in the direction of least displacement to said station, means responsive to the rotary member reaching a predetermined position in advance of the selected station to deenergize the selected relay means, dynamic braking means including field resistance means for connection in series with said field winding and armature resistance means for connection across said armature, braking relay means controlling contacts in series with said field winding resistance means and said armature resistance means for actuation to connect said field and armature resistance means in series with the field winding and armature respectively, and means responsive to deenergization of said forward and reverse relay means and to the rotary member reaching a predetermined position in advance of the selected station to actuate said braking relay means to connect said dynamic braking means with said motor.

9. A drive and positioning system for a rotary member to be selectively angularly positioned at any one of a plurality of stations, comprising, a rotary drive member for rotation in respective opposite directions including a field winding and an armature, reversible energizing control means operable to connect said drive motor for angular displacement in a direction for least movement between angular positions thereof and comprising forward and reverse relay means having first and second forward and reverse contacts in series with said armature for controlling energization of said armature in forward and reverse senses respectively, means responsive to the position of said drive motor in relation to the selected angular position thereof for selectively energizing said forward and reverse relay means for rotation of the motor in the direction of least displacement to said station, means responsive to the rotary member reaching a predetermined position in advance of the selected station to deenergize the selected relay means, dynamic braking means including field resistance means for connection in series with said field and armature resistance means for connection across said armature, and braking relay means controlling contacts in series with said field winding resistance means and said armature resistance means for actuation to connect said field and armature resistance means in series with the field winding and armature respectively and means responsive to deenergization of said forward and reverse relay means and to the rotary member reaching a predetermined position in advance of the selected station to actuate said braking relay means to connect said dynamic braking means with said motor, said forward and reverse relay means each having normally closed contacts in series with the energizing circuit for said braking relay means to prevent actuation of said braking relay means until said forward and reverse relay means have been deenergized.

References Cited in the file of this patent

UNITED STATES PATENTS

| | | |
|---|---|---|
| 1,121,986 | Barnum | Dec. 22, 1914 |
| 2,085,442 | Newell | June 29, 1937 |
| 2,108,607 | Nelson | Feb. 15, 1938 |
| 2,137,721 | Jones | Nov. 22, 1938 |
| 2,267,135 | Roberts | Dec. 23, 1941 |
| 2,321,556 | Raskhodoff | June 8, 1943 |
| 2,474,576 | Fedotoff | June 28, 1949 |
| 2,475,271 | Yardeny | July 5, 1949 |
| 2,493,844 | Yardeny | Jan. 10, 1950 |

FOREIGN PATENTS

| | | |
|---|---|---|
| 941,271 | France | Jan. 6, 1949 |